Figure 1:
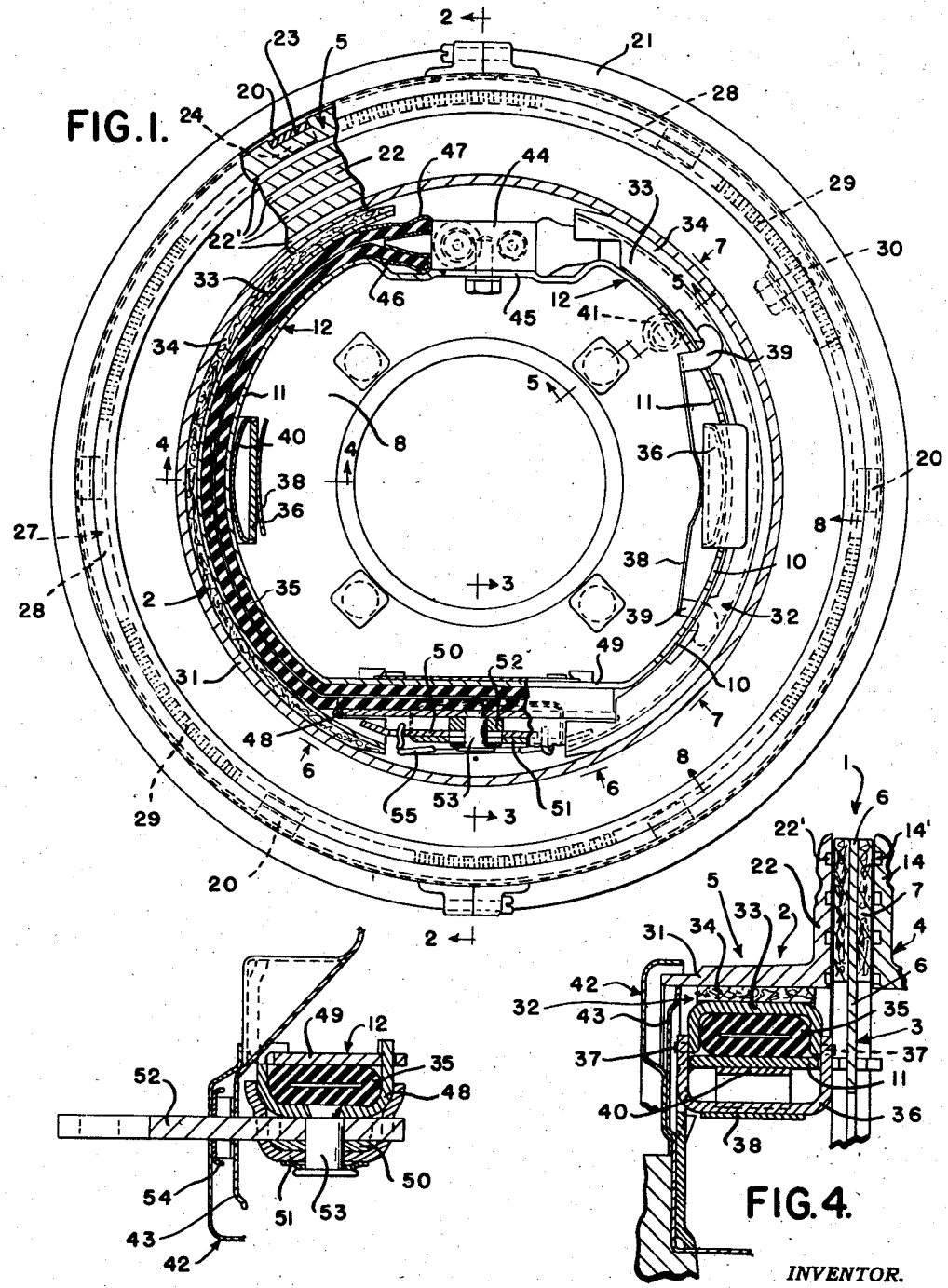

May 22, 1945.   J. SNEED   2,376,828
BRAKE
Filed Aug. 15, 1941   3 Sheets-Sheet 1

INVENTOR.
JOHN SNEED
BY Whittemore Hulbert & Belknap
ATTORNEYS

May 22, 1945.    J. SNEED    2,376,828
BRAKE
Filed Aug. 15, 1941    3 Sheets-Sheet 2

INVENTOR.
JOHN SNEED
BY
ATTORNEYS

May 22, 1945.  J. SNEED  2,376,828
BRAKE
Filed Aug. 15, 1941  3 Sheets-Sheet 3
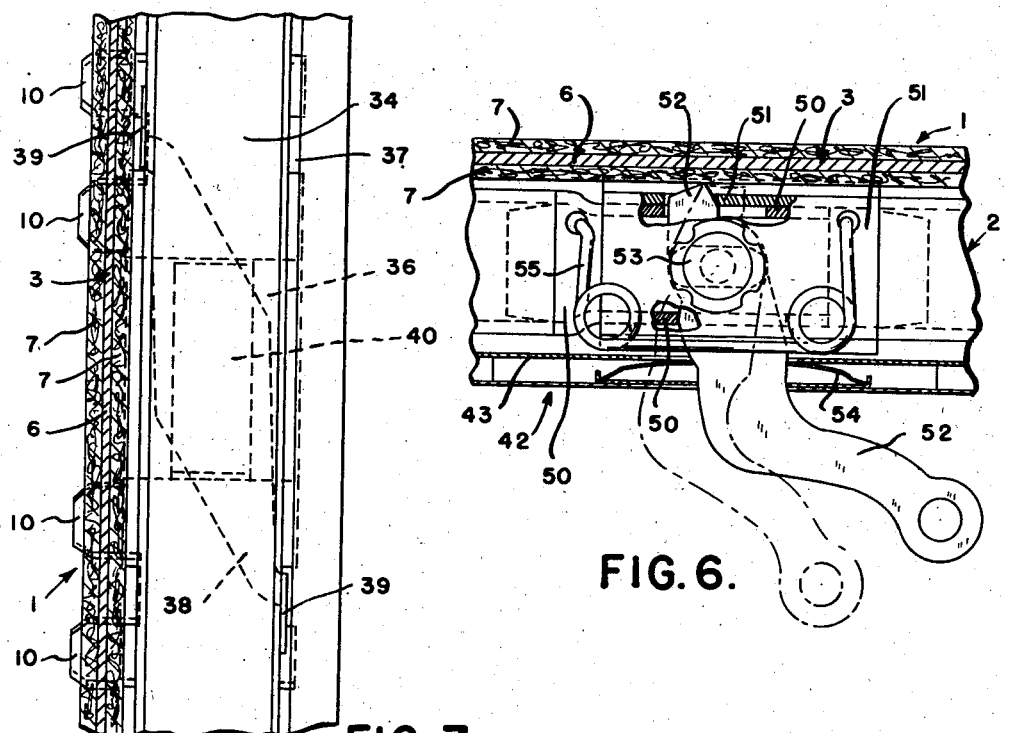
FIG. 6.
FIG. 7.
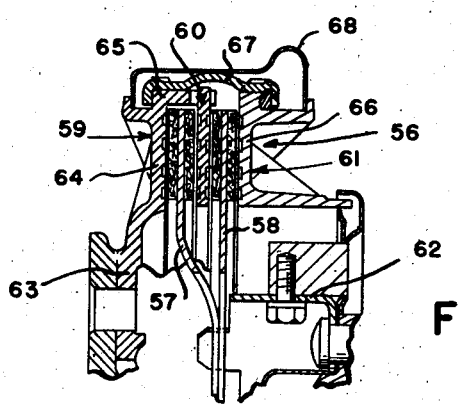
FIG. 9.
INVENTOR.
JOHN SNEED
BY
ATTORNEYS Patented May 22, 1945

2,376,828

UNITED STATES PATENT OFFICE 2,376,828

BRAKE

John Sneed, Huntington Woods, Mich.

Application August 15, 1941, Serial No. 407,041

21 Claims. (Cl. 188—72)

The invention relates to brakes and refers more particularly to brakes of the momentum type.

The invention has for an object to provide an improved construction of brake comprising pilot and main brake mechanisms constructed and arranged to produce an effective brake.

The invention has for another object to form the main brake mechanism in such a manner that the heat dissipating brake members are rotatable and externally exposed directly to the air to facilitate dissipation of the generated heat.

The invention has for another object to produce a braking system having the well-known characteristic of self-energization in which the self-energizing factors are not changed through deformation by braking stresses during application of the brake.

The invention has for another object to produce a brake having high self-energizing factors, but in which the self-energizing factors are largely the result of mechanical linkage and not of deformation of brake parts.

The invention has for another object to produce a brake having a flexible diaphragm operated brake mechanism in which the diaphragm is remotely positioned from the main brake mechanism so that the diaphragm is subject to only a very small portion of the heat generated by the main brake mechanism.

The invention has for another object to produce a main brake mechanism that may be assembled as part of a wheel drum structure and may remain assembled when the wheel is removed.

The invention has for a further object to form the pilot brake mechanism that it may be readily applied at relatively low pressure.

With these as well as other objects in view, the invention resides in the novel features of construction and combinations and arrangement of parts, as more fully hereinafter set forth.

Figure 2:
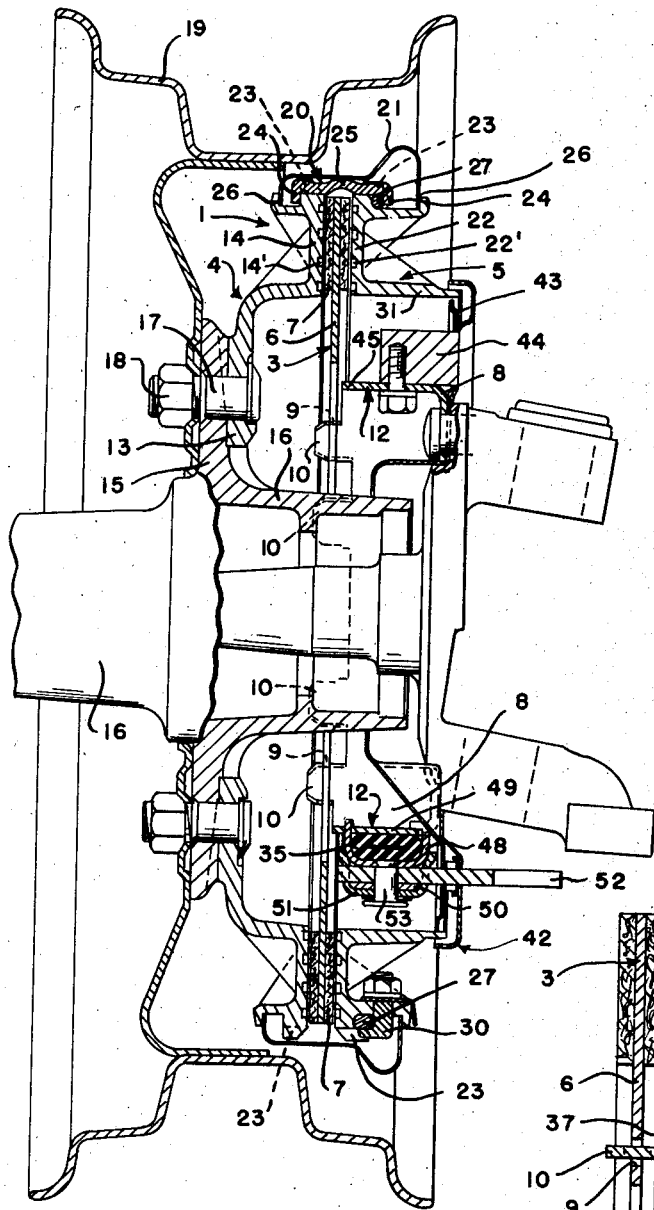
Figure 8:
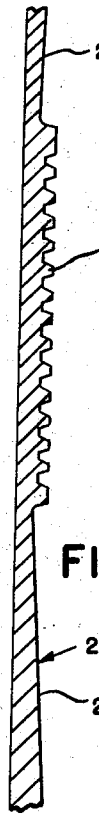
Figure 5:
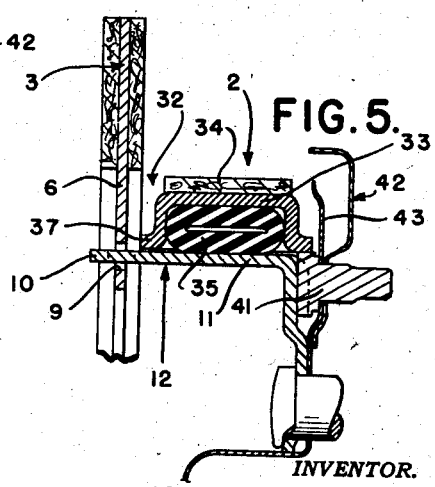

In the drawings:

Figure 1 is an outboard elevation, partly broken away and in section, of a brake embodying the invention;

Figures 2, 3, 4, 5, 6, 7 and 8 are cross sections on the lines 2—2, 3—3, 4—4, 5—5, 6—6, 7—7 and 8—8, respectively, of Figure 1;

Figure 9 is a view similar to a portion of Figure 2 showing a modification.

The brake, as illustrated in the drawings, comprises the main brake mechanism 1 and the pilot brake mechanism 2 for applying the main brake mechanism. In the present instance, the brake is shown as applied to an automobile wheel.

The main brake mechanism 1 comprises the brake member 3 held from rotation and the outboard and inboard brake members 4 and 5, respectively, normally rotatable one with and at the same rate as the other. The brake member 3 comprises the metal disc 6 and the friction linings 7 secured to opposite sides of the disc near its radially outer edge and engageable with the outboard and inboard brake members 4 and 5, respectively, upon relative axial movement. The disc is axially slidably mounted on the carrier plate 8 which is fixedly secured to either a housing of a rear axle or a steering knuckle of a front axle. As shown, the disc has the openings 9 at its radially inner edge for receiving the projections 10 on the diametrically opposite arcuate portions 11 of the axial flange 12 formed on the carrier plate 8. The brake members 4 and 5 are in the nature of discs and are formed throughout of metal to have good heat conducting properties. The brake members 4 and 5 are externally exposed to the air to more rapidly dissipate the heat generated in applying the main brake mechanism.

The outboard brake member 4 has a radial bolting-on portion 13 which is offset axially in an outboard direction relative to the radial disc portion 14 for engaging the non-rotatable brake member 3. The bolting-on portion is located radially inwardly of the disc portion and is fixedly secured to the fixed flange 15 of the hub 16 by the bolts 17 which are engaged by the nuts 18 for securing the wheel 19 to the hub. The inboard brake member 5 is carried by the outboard brake member 4 by means of the series of angularly spaced channel-shaped links 20 and the channel-shaped annulus 21. The links are preferably formed of spring steel and are equally spaced about the radially outer edges of the disc portions 14 and 22 of the outboard and inboard brake members, respectively. The links extend through axial notches 23 in the radially outer edges of the outboard and inboard brake members and have radially inturned end portions 24 forming abutments for engaging oppositely facing shoulders at the radially outer edges of the outboard and inboard brake members. More particularly, the end portions have their end parts engageable with the shoulders on the brake members, the end parts being at opposite sides of the longitudinal median planes of the links. The links are formed intermediate their end portions with the radially outwardly bowed portions 25, which engage the base of the channel-shaped annulus 21 encircling the brake members 4 and 5. The annulus 21 is formed of spring steel and has radially inwardly extending end portions 26 at its edges for engaging annular shoulders formed on the outboard and inboard brake members 4 and 5, respectively, and opposed to the annular shoulders engaged by the inturned end portions of the links. The annulus 21 is preferably formed of two semi-circular parts fixedly secured together at their ends, the construction being such that the annulus may be readily assembled with the brake members.

With this arrangement the links 20 and the annulus 21 support the inboard brake member 5 upon the outboard brake member 4. Also, the annulus resiliently urges the inboard brake member 5 axially away from the outboard brake member 4. When the brake is in normal or off position, the links 20 extend axially and the disc portions 14 and 22 of the outboard and inboard brake members are spaced from the adjacent linings 7 of the brake member 3, the latter being axially movable on the projections 10 of the carrier plate. The inboard brake member also is rotated with and at the same rate as the outboard brake member.

For the purpose of controlling the clearance between the disc portions of the outboard and inboard brake mmebers and the adjacent linings of the intermediate brake member, I have provided an adjustable shoulder means between the inboard brake member and the cooperating inturned ends 26 of each of the actuating links 20 in the nature of a ring 27 mounted on the inboard brake member. The ring is formed with a cam portion 28 for each inturned end portion and with the rack 29, the teeth of which are engageable with a suitable tool, such as a special wrench or spanner, insertable through a hole radially inside the rack for adjusting the rack. The clamp 30 secures the ring in its adjusted position. The ring is adapted to be moved circumferentially and its cam portions are adapted to operate simultaneously upon the associated inturned end portions of the actuating links.

By causing the inboard brake member 5 to rotate at a different rate than the outboard brake member 4, as by retarding the inboard brake member, the actuating links 20 will swing from their normal axial positions, thereby moving the inboard brake member axially in an outboard direction against the intermediate brake member and then moving the latter axially in an outboard direction against the outboard brake member, at which time the outboard and inboard brake members are held against the intermediate brake member and the main brake mechanism is applied. When the links swing from their normal axial positions the end parts of the end portions fulcrum upon the brake members and cooperate to effect the relative movement of the brake members, the end parts being arranged in pairs located generally diagonally of the intermediate portions of the links. Upon relative rotation of the brake members in one direction one pair of end parts cooperate and upon relative rotation of the brake members in the other direction the other pair of end parts cooperate. The width and the length of each link (width of approximately one-half the length, as illustrated) limits the angular range through which each link swings during the application of the brake so that the lines connecting the cooperating end parts are inclined at all times to the axes of the brake members. The inboard brake member is caused to move from its normal or off position by the pilot brake mechanism 2 which comprises the drum 31 and the brake friction means or element 32. The drum, as shown, is integral with the inboard brake member 5 and has an internal friction face which is engageable by the brake friction means or element. The brake friction means or element comprises the two channel-shaped shoes 33 having the linings 34 secured to their webs. The channels of the shoes open radially inwardly and the side flanges of the channels extend adjacent to the arcuate portions 11 of the axial flange 12 of the carrier plate and cooperate therewith to form arcuate spaces for receiving the expansible diaphragm 35 which extends circumferentially inside the webs of the shoes and which upon expansion is adapted to force the linings 34 against the internal friction face of the drum. The shoes are alike and each is anchored at points equidistant from its ends so that it operates in the same manner for either direction of rotation of the drum. In detail, 36 is a channel-shaped anchor opening radially outwardly with its base radially inside each arcuate portion 11 of the axial flange 12 and its side flanges extending through slots in the arcuate portions 11 and also in the axail flanges 37 at the radially inner edges of the side flanges of the associated shoe. With this arrangement, the ends of the side flanges of each anchor are loosely engageable with and are adapted to abut shoulders formed at the ends of slots in the associated arcuate portion 11 and axial flanges 37.

For retracting each shoe, there is the spring 38 extending chordwise and fulcrumed at its middle on the base of the adjacent anchor 36. The spring has at its ends the hooks 39 which are located at opposite sides of the side flanges of the associated shoe and extend through slots in the adjacent arcuate portion 11 and also through slots in the axial flanges 37 and are hooked over the latter. For normally retaining each anchor in its radially inward position, there is the spring 40 which is located between an arcuate portion 11 and the web of the anchor. The spring 40 is stronger than the spring 38.

To adjust the shoes, I have provided for each shoe the eccentric 41 which is carried by the shield and baffle unit 42 and is engageable with the axial flange 37 at the inboard side of the shoe. The baffle 43 resiliently engages the eccentric to hold the same in its position of rotative adjustment.

The diaphragm 35 is in the nature of hose or tubing and has a generally elliptical cross section with flat radially inner and outer sides. The ends of the diaphragm are secured to the fitting 44 which is mounted on the chord portion 45 of the axial flange 12 of the carrier plate. The fitting has at each end the generally elliptically cross-sectioned nipple 46 for extending into an end of the diaphragm and a correspondingly cross sectioned ferrule 47 secures the end of the diaphragm to the nipple. For cooperating with the portion of the diaphragm between the ends of the shoes opposite the fitting 44, there is the cover 48 of channel shape having lugs or ears on its side flanges extending over the radially inner side of the chord portion 49 of the axial flange of the carrier plate. The cover with the chord portion, it will be noted, forms a space for receiving the intermediate portion of the diaphragm.

To operate the pilot brake mechanically, inner and outer channel-shaped pushers 50 and 51, respectively, are operatively connected to the ends of the shoes opposite the diaphragm fitting 44. The pushers are nested and so located with respect to the diaphragm cover 48 that sufficient space is provided for the lever 52 to extend between the bases of the inner pusher and the cover. The lever is pivoted to the cover by the rivet 53 fixed to the base of the cover and extending through slots in the bases of the pushers. The lever extends through openings in the side walls of the pushers and abuts the ends of certain of the openings formed in the side walls of the pushers to longitudinally move the same in opposite directions. More particularly and with reference to Figure 6, the construction is such that when the lever is swung from the position shown in full lines to the position shown in dotted lines the pushers will be relatively moved longitudinally to separate the ends of the shoes and apply the pilot brake mechanism. The lever also extends through an elongated opening in the combined baffle and shield unit and this opening is closed by the closure 54 located between the baffle and shield and sleeved upon the lever. To hold the pushers in their retracted positions, there is the wire spring 55 having ends for engaging holes in opposite ends of the pushers.

For the purpose of making the brake more effective, the disc portions 14 and 22 of the rotatable brake members are formed with the spiral grooves 14' and 22', respectively, facing the linings of the non-rotatable brake members and providing spiral lands preferably having square corners, the lands being engageable with the linings. Assuming the wheel to be rotating and the parts to be in the positions indicated in the drawings, the main brake mechanism 1 is applied by the pilot brake mechanism 2, which latter is applied by expanding the diaphragm 35 by fluid under pressure, or by swinging the lever 52 to the position shown in dotted lines in Figure 6, by means of which the linings 34 of the shoes 33 are moved against the internal friction face of the drum 31. The shoes are held from peripheral movement with the drum by the anchors 36 which are resiliently held in their radially inward positions by the springs 40 and which serve with the springs 38 to resiliently hold the shoes in retracted positions. The application of the shoes to the drum retards the rotation of the drum and, consequently, applies the main brake mechanism by retarding the rotation of the inboard brake member 5 relative to the outboard brake member 4 of the main brake mechanism. As a result, the actuating links 20 swing from their normally axial positions, thereby moving the inboard brake member 5 axially in an outboard direction against the non-rotatable intermediate brake member 3 and then moving the latter axially in an outboard direction against the outboard brake member.

Upon release of the actuating pressure on the diaphragm or the lever, the parts of the pilot brake mechanism 2 are returned to normal or off positions by the springs 40 and 38 and the anchors 36, after which the rotatable brake parts of the main brake mechanism 1 are returned to normal or off positions by the resilient annulus 21 and the links 20, sufficient clearance between the rotatable brake members being provided for the non-rotatable brake member.

The brake of Figure 9 is of the same general construction as the brake of Figures 1 to 8, inclusive, but differs in the specific construction of the main brake mechanism 56. The latter comprises the non-rotatable outboard and inboard brake members 57 and 58, respectively, and the rotatable outboard intermediate and inboard brake members 59, 60 and 61, respectively. The non-rotatable brake members 57 and 58 are metal discs axially slidably mounted on the carrier plate 62 in the same manner as the disc 3 on the carrier plate 8. The discs have secured to their opposite sides near their outer peripheries brake linings for engaging the rotatable brake members. The rotatable outboard brake member 59 has the radial bolting-on portion 63, the radial disc portion 64, and the annular portion 65 extending axially in an inboard direction from the periphery of the disc portion. The free edge of the annular portion is provided with axial slots for receiving radial fingers at the radially outer edge of the intermediate brake member 60. This intermediate brake member is a disc located between the non-rotatable brake members and axially movable relative to the rotatable outboard brake member to provide for frictional engagement of all the brake members upon application of the pilot brake. The rotatable inboard brake member has the radial disc portion 66 for engagement with the non-rotatable inboard brake member. The rotatable inboard brake member is carried by the rotatable outboard brake member in the same manner as in the construction illustrated in Figures 1 to 8, inclusive, by means of the angularly spaced channel-shaped links 67 and the channel-shaped annulus 68. The links and the annulus function in the same manner as the links 20 and the annulus 21 of the previously described modification.

From the above description, it will be readily seen that I have provided an effective, powerful brake comprising pilot and main brake mechanisms; a brake in which the heat dissipating brake members are rotatable and externally exposed directly to the air stream to facilitate cooling, a brake having the well-known characteristics of self-energy so constructed that the self-energizing factors principally of the main brake mechanism are not changed through deformation; a brake in which the diaphragm for actuating the pilot brake mechanism is remotely positioned from the main brake mechanism so that the diaphragm is subject to only a very small portion of the heat generated by the main brake mechanism; and a brake which is mounted independently of the wheel so that the latter may be removed without disturbing the brake.

What I claim as my invention is:

1. In a brake, rotatable brake members movable axially relative to each other, and means for moving said members axially relative to each other and also mounting one of said members relative to the other, comprising operating links extending between and connecting said members, and an annular member encircling said members and supporting said operating links.

2. In a brake, brake members normally rotatable one with the other, angularly spaced members embracing portions of and operatively connected to said first mentioned members for relatively moving the same axially toward each other upon relative rotation of said first mentioned members, and means for simultaneously adjusting the operative connection between one of said first mentioned members and said angularly spaced members.

3. In a brake, rotatable brake members movable axially relative to each other, angularly spaced operating links having abutments embracing portions of said members, and a ring adjustably carried by one of said rotatable members having cams engageable with the adjacent abutments of said ring.

4. In a brake, rotatable brake members movable axially relative to each other, actuating links connecting said brake members for relatively moving the same axially toward each other upon relative rotation thereof, and an annular member encircling said actuating links and said brake members and operatively connected to the latter, said annular member retaining said operating links, forming a seal and normally holding said brake members away from each other.

5. In a brake, a brake disc normally held from rotation, rotatable brake discs on opposite sides of said first mentioned disc and engageable therewith, and operating links extending over said first mentioned disc and operatively connected to said second mentioned discs for relatively moving all of said discs axially toward each other upon rotation of one of said rotatable discs at a different rate than the other of said rotatable discs.

6. In a brake, rotatable brake discs movable axially relative to each other, one of said discs being operatively connected to a drum having an internal friction face, brake friction means engageable with the internal friction face to retard said drum and said disc operatively connected to said drum, a diaphram for radially moving said brake friction means against the internal friction face, and means dependent upon retardation of said disc operatively connected to said drum for relatively moving the same axially toward the other disc.

7. In a brake, a main brake mechanism comprising brake disc means normally held from rotation, cooperating brake disc means comprising external brake discs normally rotatable one with the other and having annular surfaces frictionally engageable with said first mentioned brake disc means, and means dependent upon retardation of one of said external brake discs for relatively moving said external brake discs and first mentioned brake disc means axially to bring the same into engagement, and a pilot brake mechanism for retarding one of said external brake discs, said pilot brake mechanism being substantially radially within said annular surface of said last mentioned external brake disc.

8. In a brake, rotatable brake members movable axially relative to each other, means for moving said members axially relative to each other and also mounting one of said members on the other comprising operating links extending between and operatively connected to said members, and means for retaining said links comprising an annular member positioned by one of said members and encircling and engaging portions of said links.

9. In a brake, a rotatable brake member having an internal friction face, brake friction means engageable with the internal friction face comprising a brake shoe having substantially radial shoulders, a plate having an axially extending flange formed with substantially radial shoulders, a channel-shaped anchor for said shoe opening radially outwardly with its base radially inside said flange and its side flanges extending past said flange and engageable with said shoulders of said shoe and flange, and an actuator extending within said shoe.

10. In a brake, brake members movable axially relative to each other and means for relatively axially moving said brake members comprising angularly spaced resilient links extending between and operatively connected to said brake members, said links being bowed intermediate their zones of connection to said brake members.

11. In a brake, brake members movable axially relative to each other and provided with oppositely facing shoulders, and means for moving said brake members axially relative to each other comprising resilient channel-shaped links extending between said brake members and abutting said shoulders.

12. In a brake, brake members movable axially relative to each other and provided with oppositely facing shoulders on their peripheries, and means for moving said brake members axially relative to each other comprising angularly spaced resilient links extending between said brake members and having generally radially extending end portions embracing said shoulders.

13. In a brake, a main brake mechanism comprising brake members normally rotatable one with the other, intermediate brake means normally held from rotation and engageable with said first mentioned brake members, and links extending between and operatively connected to said brake members and having portions extending over said brake means radially outwardly thereof, said links being operable upon retardation of one of said brake members to relatively move said brake members and brake means toward and into engagement with each other, and a pilot brake mechanism comprising a pilot brake member secured to one of said first mentioned brake members at its radially inner edge and rotatable therewith, friction means normally held from rotation and engageable with said pilot brake member, and means for moving said friction means into engagement with said pilot brake member.

14. In a brake, a main brake mechanism comprising brake discs normally rotatable one with the other, intermediate brake disc means normally held from rotation and engageable with said first mentioned discs, and links extending between and operatively connected to said first mentioned discs and having portions extending over said intermediate disc means radially outwardly thereof, said links being operable upon retardation of one of said first mentioned discs to relatively move said first mentioned discs and intermediate disc means toward and into engagement with each other, and a pilot brake mechanism comprising a pilot brake drum secured to one of said first mentioned discs at its radially inner edge and rotatable therewith, friction means normally held from rotation and engageable with said pilot brake drum, and means for moving said friction means into engagement with said pilot brake drum.

15. In a brake, rotatable brake members movable axially relative to each other, means for moving said members axially relative to each other comprising operating links extending between and operatively connected to said members, and means for retaining said links comprising an annular member positioned by one of said members and encircling and engaging portions of said links.

16. In a brake, brake members rotatable in either direction and movable axially toward and away from each other and means operable upon relative rotation of said brake members in either direction for relatively moving said brake members toward each other comprising links acting under tension and extending between and swingable by said brake members, each link having a portion normally extending generally axially of said brake members and other portions extending generally radially of said brake members and engageable with oppositely facing portions of said brake members, each of said generally radial portions having parts at opposite sides of the longitudinal median plane of said link with the parts located generally diagonally of said generally axial portion cooperating to effect the relative movement of said brake members toward each other, the lines connecting the cooperating parts being inclined at all times to the axes of said brake members.

17. In a brake, brake members rotatable in either direction and movable axially toward and away from each other, and means operable upon relative rotation of said brake members in either direction for relatively moving said brake members toward each other comprising links acting under tension, each link having four parts for contact with said brake members with two parts cooperating upon relative rotation in one direction and the other two parts cooperating upon relative rotation in the other direction to effect the relative movement of said brake members toward each other, the lines connecting said cooperating parts being inclined at all times to the axes of said brake members.

18. In a brake, brake members rotatable in either direction and movable axially toward and away from each other, and means operable upon relative rotation of said brake members in either direction for relatively moving said brake members toward each other comprising links acting under tension, each link having at one end two parts for contact with one of said brake members and at the other end a portion for contact with the other of said brake members, said portion cooperating with one of said parts upon relative rotation in one direction and with the other of said parts in the other direction to effect the relative movement of said brake members toward each other, the lines connecting the portion and parts being inclined at all times to the axes of said brake members.

19. In a brake, brake members relatively movable axially toward and away from each other and also relatively rotatable in opposite directions with respect to each other, and means operable upon relative rotation of said brake members in either direction for relatively moving said brake members toward each other comprising links acting under tension, each link having a portion extending generally axially of the brake and other portions extending transversely of said generally axial portion, said other portions having cooperating parts for relatively moving said brake members toward each other in either direction of relative rotation of said brake members, the lines connecting said cooperating parts being inclined at all times to the axis of the brake.

20. In a brake, brake members relatively movable axially toward and away from each other, one of said brake members being rotatable in opposite directions, and means for relatively moving said brake members toward each other in either direction of rotation of said rotatable brake member comprising links acting under tension, each link having a portion extending generally axially of the brake and other portions extending generally radially of the brake, said generally radial portions having cooperating parts for relatively moving said brake members toward each other in either direction of rotation of said rotatable brake member, the lines connecting said cooperating parts being inclined at all times to the axis of said brake.

21. In a brake, brake members relatively movable axially toward and away from each other, one of said brake members being rotatable in opposite directions, and means for relatively moving said brake members toward each other in either direction of rotation of said rotatable brake member comprising links acting under tension, each link having a portion extending generally axially of the brake and other portions extending transversely of said generally axial portion, said first mentioned portion and other portions having cooperating parts for relatively moving said brake members toward each other in either direction of rotation of said rotatable brake member, the lines connecting said cooperating parts being inclined at all times to the axis of the brake.

JOHN SNEED.